United States Patent [19]

Simpson et al.

[11] E Re. 29,644

[45] Reissued May 30, 1978

[54] BAG FORMING MACHINES

[75] Inventors: Arthur William Simpson, Hemel Hempstead; Frank William Pocock, East Harptree, both of England

[73] Assignee: Simon-VK Limited, Wirral, England

[21] Appl. No.: 780,185

[22] Filed: Mar. 22, 1977

Related U.S. Patent Documents

Reissue of:

[64] Patent No.: 3,867,873
Issued: Feb. 25, 1975
Appl. No.: 410,415
Filed: Oct. 29, 1973

[30] Foreign Application Priority Data

Oct. 27, 1972 United Kingdom ..... 49536/72
July 12, 1973 United Kingdom ..... 33342/73

[51] Int. Cl.[2] ..... B31B 1/64

[52] U.S. Cl. ..... 93/33 H; 93/DIG. 1; 156/515

[58] Field of Search ..... 93/33 H, 33 R, 8 R, 93/DIG. 1, 17-26, 84 R; 156/515; 83/171

[56] References Cited

U.S. PATENT DOCUMENTS

| | | | |
|---|---|---|---|
| 2,229,121 | 1/1941 | Nye et al. | 93/19 |
| 3,004,881 | 10/1961 | Van Der Meulen | 93/8 R X |
| 3,052,282 | 9/1962 | Bruckhauser et al. | 156/515 |
| 3,059,690 | 10/1962 | Nyborg | 93/DIG. 1 |

FOREIGN PATENT DOCUMENTS

| | | |
|---|---|---|
| 1,153,779 | 5/1969 | United Kingdom. |
| 49,536 | 10/1972 | United Kingdom. |
| 33,342 | 7/1973 | United Kingdom. |

*Primary Examiner*—James F. Coan
*Attorney, Agent, or Firm*—Wenderoth, Lind & Ponack

[57] ABSTRACT

The specification discloses apparatus for forming individual heat sealed articles, e.g., tubes or bags, from a strip of two superimposed layers of heat sealable material or of a material coated, or impregnated, with a heat sealable material which apparatus comprises means to feed the strip in a zig-zag configuration and means for welding together the layers of the strip at or adjacent the transverse crests of the strip located on one side of the zig-zag. The welding means comprise a single continuous welding device and the feed means includes means for supporting the strip at the transverse crests located on the mentioned one side of the zig-zag and for presenting those crests to the welding device.

4 Claims, 2 Drawing Figures

BAG FORMING MACHINES

Matter enclosed in heavy brackets [ ] appears in the original patent but forms no part of this reissue specification; matter printed in italics indicates the additions made by reissue.

BACKGROUND OF THE INVENTION

This invention relates to apparatus for forming heat sealed articles from a strip of two superimposed layers of heat sealable material.

British Pat. Specification Nos. 815,006 and 1,054,644 both disclose apparatus for forming heat sealed articles from a zig-zag strip of two superimposed layers of heat sealable material. In both these specifications the strip is supported on one side only of the zig-zag and several heating sources are provided to engage the strip at the transverse crests along that side of the strip. A severe disadvantage of such an arrangement is that it is extremely difficult to maintain all the sources at an even temperature with the result that different amounts of heat are supplied at the locations to be welded resulting in uneven welding conditions along the strip. Furthermore, the clamping arrangements disclosed in these patents which only support the strip along one side of the zig-zag require either heating elements located on the ends of radial arms of the central support structure, or a series of heaters located on an endless belt. Both of these arrangements are extremely complicated as well as having the uneven heat supply mentioned above.

It is an object of the invention to overcome these disadvantages and in particular to provide an apparatus in which a simplified heat sealing arrangement is provided.

SUMMARY OF THE INVENTION

The invention provides apparatus for forming individual heat sealed articles, e.g., tubes or bags, from a strip of two superimposed layers of heat sealable material or of a material coated, or impregnated, with a heat sealable material which apparatus comprises means to feed the strip in a zig-zag configuration and means for welding together the layers of the strip at or adjacent the transverse crests of the strip located on one side of the zig-zag, the improvement wherein the welding means comprise a single continuous welding device and wherein the feed means includes means for supporting the strip at the transverse crests located on such one side of the zig-zag for presenting those crests to the welding device.

BRIEF DESCRIPTION OF THE DRAWINGS

A specific embodiment of a bag forming machine according to the invention will now be described by way of example and with reference to the accompanying drawings, in which.

DETAILED DESCRIPTION OF THE INVENTION

Figure 2:
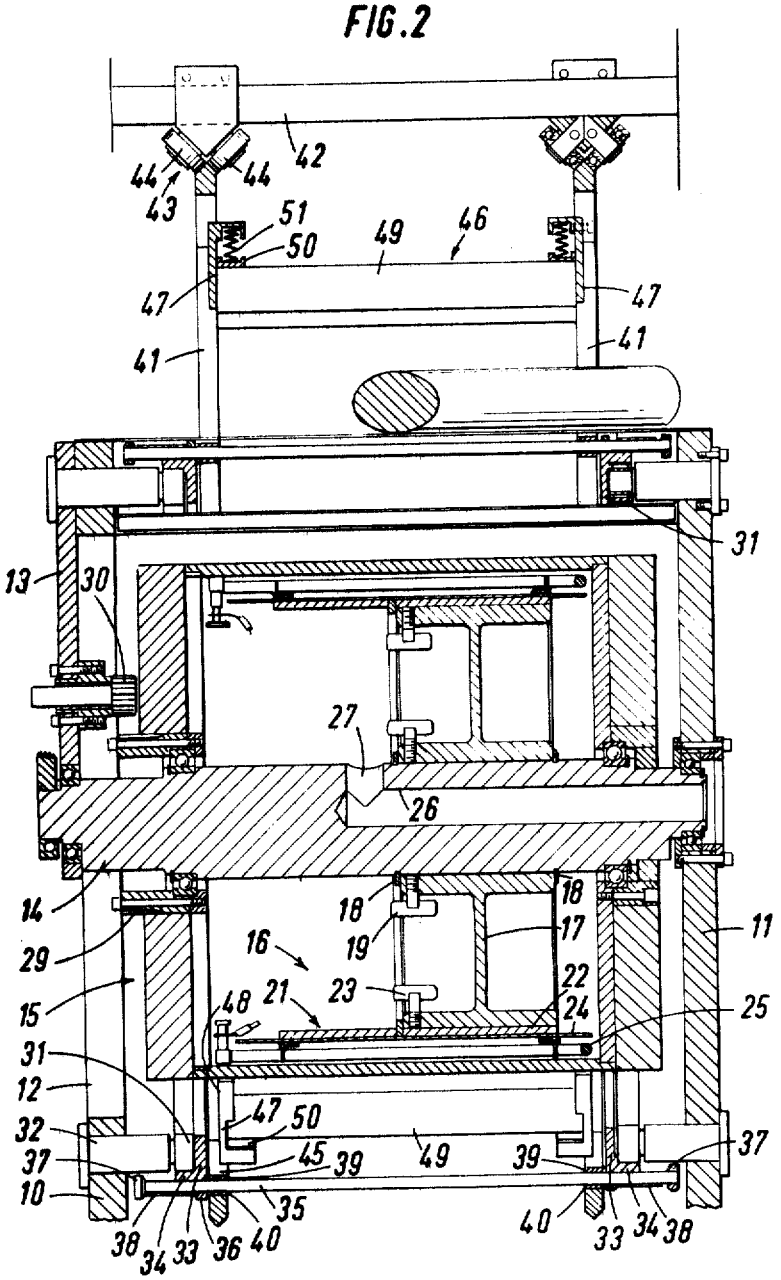
FIG. 2 is a section through the central rotating assembly of the machine of FIG. 1.

Referring to the drawings, the machine has two spaced vertical side walls 10 and 11, the wall 10 having an aperture 12. A cover plate 13 is located over a portion of the aperture 12. A shaft 14 is rotatably mounted in bearings provided in the cover plate 13 and the side wall 11. The shaft has a central portion disposed between the bearings which is eccentric to the reduced diameter end portions of the shaft which are located in the bearings. A hollow drum assembly 15 is rotatably mounted on the central portion of the shaft 14. An electrical heater assembly 16 is located on the shaft 14 within the drum 15. The heater assembly 16 comprises an I-section hub 17 located axially on the shaft 14 by two snap rings 18 which engage in peripheral recesses in the shaft 14. Screw threaded members 19 secure the inner annulus of the hub to the shaft 14. Axially extending recesses 20 are provided in the outer periphery of the hub at spaced locations around the hub. Electric heater units 21 are located in the recesses 20 and comprise an elongate plate 22 which engages in the recess 20 and extends axially to the left hand side of the hub 17 as viewed in FIG. 2. The plate 22 is secured in the recess 20 by further screw threaded elements 23 which extend through apertures in the outer annulus of the hub 17 and screw into threaded apertures provided in the plate 22. A thinner gauge plate 24 is secured to the outer face of each plate 22 and carries a U-shaped electrical heater element 25 which is mounted on flanges secured to the face of the plate 24 remote from the plate 22. An axial bore 26 extends part way along the shaft 14 from its right hand end as seen in FIG. 2. The bore 26 opens into the interior of the drum 15 at 27 to provide a passage for electrical wire for the heater elements 25.

An annular set of teeth 29 are provided on a spigot projecting from the inner periphery of the left hand end plate of the drum 15. A motor driven gear 30 is rotably mounted on cover plate 13. The teeth 29 are engageable with gear 30 by rotation of the shaft 14 through 180°, to be driven by gear 30 so that the drum is kept revolving to maintain an even heat distribution during stoppage of the machine or during start-up periods.

An annular series of rollers 31 are fixed at the free ends of spindles 32 projecting inwardly from the side walls 10 and 11. Annular plates 33 are disposed adjacent the rollers 31 and are mounted thereon by cylindrical flanges 34 integral with the plates 33 which flanges seat on the rollers 31. The plates 33 are interconnected by a series of axially extending support rods 35 which extend through and are secured in lugs 36 provided on the plates 33. The rods 35 extend axially beyond on the free ends of flanges 34 and terminate in cylindrical enlargements 37. The rods are so spaced that the portions thereof between the lug 36 and the enlargements 37 act as an annular series of teeth which are engaged by toothed driving belts 38 to rotate the support rod assembly. Each rod is provided with a pair of rollers 39 rotatably mounted thereon adjacent the faces of the plates 33 which are opposed to one another. The rollers 39 are located between the said opposed faces of the plates 33 and snap rings 40 engaged in recesses in the rods 35.

An assembly of knife-edged bars comprises side supporting plates 41 surrounding the drum 15 and lying in planes adjacent and spaced inwardly of the planes containing the plates 35 of the support rod assembly. The knife edge of the bars is formed in a known way to seal and separate the bags in operation of the machine. The peripheries of the plates 41 are formed to be V-shaped in cross section as seen in FIG. 2. The plates 41 are rotatably mounted on an annular bearing assembly comprising a series of spaced rods 42 which form part of the frame of the machine and a pair of roller bearing assemblies 43 mounted on each rod 42. Each roller bearing assembly 43 comprises two roller members 44 the axes of which are at 90° to one another such that the outer peripheries of the rollers cooperate with respective portions of the V-shaped periphery of one of the plates 41. The inner periphery of each plate 41 is formed with a series of regularly spaced slots 45 for receiving the support rods 35 as described in greater detail below. A number of spring loaded blade assemblies 46 corresponding to the number of supporting rods 35 are located between opposed portions of the plates 41 between the slots 45 therein. The assemblies 46 comprise a pair of mounting brackets 47 secured to the members 41. Each bracket 47 comprises a portion extending radially of the plate 41 and a foot portion projecting towards the opposite plate 41 from the radially outer end of the bracket. The brackets 47 are provided with spaced side walls 48 extending from the radially inner end of the bracket towards but stopping short of the flange on the bracket. Knife edged bars 49 are slidably mounted between the side walls 48 of each pair of brackets 47. A rectangular retainer plate 50 is fixed to the outer edge of each bar 49 adjacent opposite ends thereof. Coil springs 51 are located in recesses provided in opposed faces of the retainer plate 50 and the foot portions of the brackets 47 to bias the bar 49 radially inwardly of the plate 41. The retainer plates 50 engage the radially outer end of the side walls 48 of the brackets 47 under the influence of the springs 51 to retain the bars 49 in the brackets 47 whilst permitting movement of the bars radially outwards against the influence of springs 51 when a force is applied to the knife edge of the bars.

Figure 1:
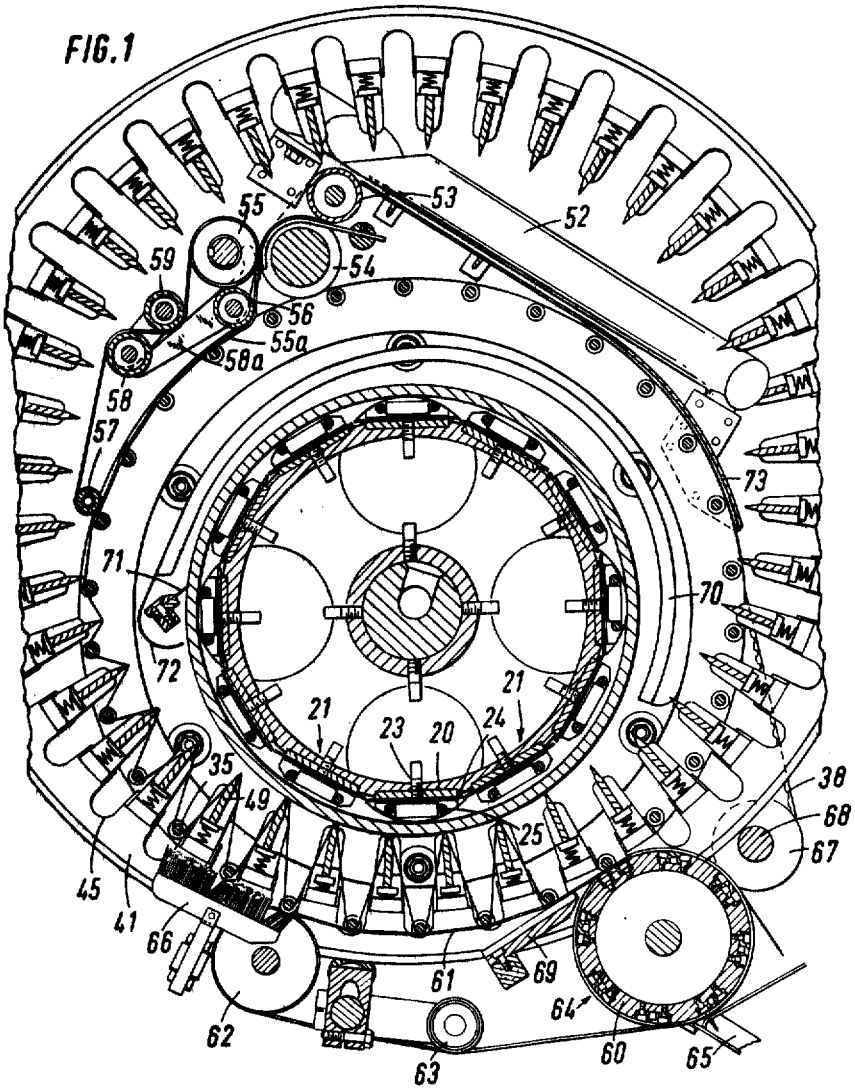
FIG. 1 is a vertical cross section through the machine.

The axis of rotation of the support rod assembly and the axis of rotation of the knife edged bar assembly are eccentric to one another so that the support rods 35 only engage in the slots 45 in the plates 41 over an arc of their overall movement as best seen in FIG. 1. It will be appreciated that when the support rod assembly is driven by the belt 38 engagement of the support rods in the slots 45 cause the simultaneous rotation of the knife edged bar assembly.

Referring now more specifically to FIG. 1 the inlet feed point for the sheet material to be formed into bags is located above the drum 15 in an area between the knife edged bars and the support rods which due to their eccentric paths are separated from one another. The inlet feed comprises a turning bar 52 fixed with respect to the frame of the machine and extending across the width of the drum at an angle of 45° to its axis. It will be appreciated that the angle of the bar can be altered to accommodate different feed directions of bag forming material to the machine. Bag forming material usually in folded sheet form is fed over the bar 52 and turned by the bar to be fed through a system of rollers onto the supporting bars 35. The roller system comprises roller 53 onto which the sheet material is directed by the bar 52. The sheet material then extends into the nip of a pair of feed rollers 54, 55 from which it is directed between the support rods at a rate to form loops between the rods 35 and held against the rods by a series of tapes 55a which extend around roller 55 and rollers 56 to 59. The tapes can be, if required, toothed tapes driven positively by the rollers. The tapes extend to the region where the path of the bars 49, intersect the path of the rods 35 so that the loops are maintained on the rods until they are located on the bars.

Roller 55 can be lifted away from roller 54 to facilitate insert of the sheet material by a lever 58a actuated by an eccentric on the shaft of roller 58.

The bags are formed and discharged at the lower end of the machine as seen in FIG. 1. A delivery cylinder 60 is rotatably mounted with its periphery adjacent the paths of movement of the support rods with a series of tapes 61 extending around cylinder 60, a roller 62 and a tensioning roller 63 to hold sheet material extending around the support rods in engagement with the rods over a portion of the arc where the rods engage in the slots 45 in the plate 41. Suction ports 64 are provided in the periphery of the delivery cylinder 60 for a purpose described below. A table 65 is provided adjacent the delivery cylinder 60 onto which the formed bags are stacked.

A number of brushes 66 are located across the width of the support rods to engage the sheet material around the support rods to tension the sheet material in the following bag forming section of the machine.

The machine is driven by a motor (not shown) which drives pulleys 67 on a common shaft 68 through a reduction gear. The pulleys 68 have toothed peripheries which cooperate with belts 38 to drive the support rod assembly. The knife edged bar assembly is driven by the engagement of support rods in slots 45 as described above and the drum is rotated by the frictional engagement between the sheet material passing over the knife edged bars at the location where the material around those bars engages the drum. The delivery cylinder 60 is driven through gears from the shaft 68 on which pulleys 67 are mounted. This gear drive is selected so that the suction ports in the delivery cylinder are aligned with the successive support rods 35 as they pass the delivery cylinder for a purpose described below. The feed rollers 54, 55 are driven directly by a belt drive from shaft 68, or they may be driven through a gear drive from that shaft.

A device for giving a visual indication of a count of bags comprises a pivotally mounted friction arm 69 which is actuated through a gear driven from the delivery cylinder 60 to momentarily engage the inside of support 35 thereby displacing the bag to give a visual indication in the delivery stack.

A heat shield in the form of a water jacket 70 is provided around the upper portion of the drum 15. Moreover heat insulating panels 70a are fitted against the end walls of the drum to provide further heat shields. These panels 70a are split in half and secured to the drum assembly so that they can be removed for inspection of the heater elements 25. Inspection ports 71a are provided in the left end wall of the drum (as viewed in FIG. 2) so that in conjunction with the aperture 12 in the wall 10 they provide access to the drum interior when the respective panel 70a is removed. A reciprocating doctor blade 71 is located to act on the periphery of the cylinder to remove material adhering to the drum and the water jacket has a curved extension 72 which acts as a collector for the material removed by by the doctor 71, which may be constructed to be easily removable for cleaning purposes. A separate geared motor is provided to reciprocate the doctor 71.

A shield 73 is provided extending from the region of separation of the support rods 35 and the knife edged blades 49 after the discharge point of the formed bags, to the periphery of the inlet roller 53 to provide a continuous surface over which the sheet material can pass from the region of separation of the support rods and knife edged blades to allow an unsealed web to be pulled right through the machine prior to start up or at a reel change.

In operation a web comprising a sheet of heat sealable plastics material folded in half longitudinally is fed over the bar 52 and turned by the bar over the roller 53. The web instead of comprising a folded sheet may be made by slitting a blown tube of high density polythene along its length. The web is fed by the rollers 54, 55 at a constant rate to the rotating rod assembly to be looped between successive pairs of rods 35. The feeding rate can be altered by changing the gear ratio of the transmission which drives the rollers. The web is held against the support rods by the tapes 55a until the region where the path of the knife edged blades intercept that of the support rods. The web may alternatively be fed by rollers 54, 55 around a series of friction rollers so it is delivered directly between the bars 49 and rods 35. In the latter arrangement the brushes 66 are not required, but assisting friction rollers are provided to engage the strip where it is caused to extend in wave form to assist feed of the sheet material into the wave formation.

As the blades move between the support rods the web is located around adjacent support rods 35 and blades 49 such that it extends in a wave formation. As the support rods and blades rotate towards the lower portion of the machine, the web around successive knife edges of the blades 49 comes into engagement with the periphery of the drum 15 so that the web is heated to weld together the superimposed sheets of heat sealable material at these locations. After sufficient heat has been transmitted to the portions of the web in contact with the drum, the welding is complete and separation of the formed bag from the remainder of the web takes place. The bag remains looped around its respective support rod 35 since it is held against it by the tapes 61. When the support rod 35 and the formed bag reach the periphery of cylinder 60, the bag is removed from the rod and held against the periphery of the roller 60 by vacuum acting through the suction ports 64 in the periphery of the delivery cylinder since it rotates in timed relationship to the support rod assembly so that the suction ports are aligned with the rods as described above. The formed bags are carried on the periphery of the cylinder 60 until they are stripped therefrom to be stacked on the table 65. The spacing of the support rods and the suction ports in the delivery cylinder 60 are such that the bags resting on the periphery of the cylinder overlap one another so that they are readily stacked on the table 65. After a preselected number of bags has been formed the frictional arm 69 of the counter device is actuated to grip the web against a support rod so that a misplaced bag is provided which when stacked on table 65 gives an easy visual indication every time the aforesaid preselected number of bags has been formed.

In order to alter the width of the formed bags, the axis of rotation of the drum 15 can be moved towards or away from the knife edged bars 49 in the bag forming region by rotating the shaft 14 on which the drum is eccentrically mounted and hence the axis of rotation of the drum. This adjustment is made possible by the provision of spring loaded knife edged blades which can accommodate adjustment over a certain range before the drum is moved completely out of contact with the blades. Another method of altering the bag width is to remove every other knife edged bar, or every other knife edged bar and every other support rod.

Many modifications of the above described embodiment are possible within the scope of the invention for example the support rods can be located on a continuous chain rather than on a rotating disc, the chain being guided such that the path of the heater bars intercepts the path of the support rods before and after the bag forming zone with the heater bars resiliently biased against the drum 15 as in the embodiment illustrated in the drawings. It is also possible to provide heater bars and the support rods on respective chains, the paths of the bars and the rods intercepting before and after a linear bag forming zone in which the surface of the heat source is a planar surface against which the heater bars are resiliently biased.

It is also possible for the heat source to be provided in the bars instead of in the drum 15 or heat sources may be provided in both the drum and the bars.

It will be appreciated that the production of bags on a machine according to the invention can be considerably greater than the conventional method of forming such bags i.e., feeding blanks to a heat pressing machine which is enclosed to weld the side edges of the bag. In the conventional machine there is a period during which the blanks are fed to the machine when no heat is applied to the bags. A machine according to the invention has the advantages over the stop-start procedure of a conventional machine in that a continuous feeding and heating operation takes place whereby while one bag is having its edges sealed and separated further material is being fed into the heating zone and indeed the sealing operation of subsequent bags is initiated before the previous bags have been completed. This results in a considerable increase in the number of bags produced in a given time over the above described conventional machine and indeed the production can be further increased by altering the pitch of the wave form of the web in the bag forming zone.

We claim:

1. Apparatus for forming individual heat sealed articles, e.g. tubes or bags, from a strip of two superimposed layers of heat sealable material or of a material coated, or impregnated, with heat sealable material, said apparatus comprising:

a welding device comprising a continuous surface of heat transmitting material;

means to heat said surface; [and]

means for feeding a strip of material in a zig-zag configuration along a path which extends along at least a part of said continuous surface, said feeding means comprising members supporting said strip at the transverse crests located on both sides of the zig-zag to present the crests on one side of said zig-zag to said continuous surface*; and*

*said continuous surface being cylindrical and being mounted for rotation when engaged by the moving strip.*

[2. Apparatus as claimed in claim 1, wherein said continuous surface is cylindrical and is mounted for rotation when engaged by the moving strip.]

3. In apparatus for forming individual heat sealed articles, e.g., tubes or bags, from a strip of two superimposed layers of heat sealable material or of a material coated, or impregnated with heat sealable material, which apparatus comprises means to feed the strip in a zig-zag configuration and means for welding together the layers of said strip at or adjacent the transverse crests of said strip located on one side of the zig-zag, the improvement wherein:

said welding means comprises a cylindrical surface of heat transmitting material mounted for rotation, when engaged by the moving strip, on an eccentric portion of a shaft which is itself rotatably mounted on a support structure to move the cylindrical surface towards or away from the zig-zag strip, and means for heating said cylindrical surface; and said feed means comprises means for supporting said strip at the transverse crests located on both sides of the zig-zag and for pressing said crests on said one side of said strip against said cylindrical surface, so that by moving the cylindrical surface towards or away from said zig-zag strip the width of the finished heat sealed articles can be altered.

4. Apparatus as claimed in claim 3, wherein said means for heating said cylindrical surface comprises a plurality of heating elements mounted with said cylindrical surface.

5. Apparatus as claimed in claim 4, wherein said heating elements are secured with respect to said shaft.

* * * * *